(12) United States Patent
Min et al.

(10) Patent No.: US 6,515,489 B2
(45) Date of Patent: Feb. 4, 2003

(54) APPARATUS FOR SENSING POSITION OF ELECTROSTATIC XY-STAGE THROUGH TIME-DIVISION MULTIPLEXING

(75) Inventors: Dong-ki Min, Yongin (KR); Cheol-soon Kim, Yongin (KR); Jong Up Jeon, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/879,973

(22) Filed: Jun. 14, 2001

(65) Prior Publication Data

US 2002/0027191 A1 Mar. 7, 2002

(30) Foreign Application Priority Data

Jul. 18, 2000 (KR) ........................................ 2000-40984

(51) Int. Cl.[7] .............................................. G01R 27/26
(52) U.S. Cl. ..................... 324/662; 324/661; 73/514.32
(58) Field of Search ................................ 324/661, 662, 324/207.114; 250/231.13; 73/514.32, 514.18, 514.17; 318/254, 138, 432–439

(56) References Cited

U.S. PATENT DOCUMENTS 5,187,417 A * 2/1993 Minnich et al. ............ 318/254
5,511,420 A * 4/1996 Zhao et al. ............... 73/514.18
5,751,683 A 5/1998 Kley
5,939,633 A * 8/1999 Judy ........................ 73/514.32

FOREIGN PATENT DOCUMENTS

EP 0 763 881 3/1997

OTHER PUBLICATIONS

H. Ahmad et al., "A Two-Dimensional Micromachined Accelerometer", IEEE Transactions on Instrumentation and Measurement, vol. 46, No. 1, pp. 18–236 1999.

M. A. Lemkin et al., "A 3–axis Force Balanced Accelerometer Using a Single Proof–Mass", International Conference on Solid–State Sensor and Actuators (Transducers '97), vol. 2, pp. 1185–1188.

K. Jono et al., "Electrostatic Serve System for Multi–Axis Accelerometers", IEEE Workshop on Micro Electro Mechanical Systems (MEMS '94) pp. 251–256.

* cited by examiner

*Primary Examiner*—Christine Oda
*Assistant Examiner*—Amy He
(74) *Attorney, Agent, or Firm*—Burns Doane Swecker & Mathis, LLP

(57) ABSTRACT

The apparatus senses the positions of X- and Y- axes of the stage by applying an excitation signal having a phase difference to a stator of each axis of the XY-stage and then time-division detecting changes in capacitance from a moving plate. The apparatus includes: a moveable stage, rotor combs connected to the stage, and stator combs of predetermined axes, wherein differential capacitors are formed between the rotor and stator combs; an amplifier connected to the stage for outputting position information in a time-division manner, in which a time constant is designed so as to prevent interference between position information output from the stage; a sample/hold unit for sampling and holding the time-division position information output from the amplifier in response to a timing control signal; and a controller which outputs a control signal such that the time-division position information from the amplifier can be sampled and held when the information reaches a maximum, reads position information output from the sample/hold unit, and generates excitation signals having different phases to each be applied to a different axis.

5 Claims, 6 Drawing Sheets

APPARATUS FOR SENSING POSITION OF ELECTROSTATIC XY-STAGE THROUGH TIME-DIVISION MULTIPLEXING

BACKGROUND OF THE INVENTION

1. Field of the Invention

The present invention relates to an apparatus for sensing the position of electrostatically driven XY-stage, and more particularly, to an apparatus for sensing the position of an electrostatic XY-stage through time-division multiplexing. The apparatus senses the positions of X- and Y-axes of the stage by applying an excitation signal having a phase difference to a stator of each axis of the XY-stage and then time-division detecting changes in capacitance in response to the signal.

2. Description of the Related Art

Recently, to overcome limits in the recording density of rotary magnetic recording media, high-density storage device using scanning probe microscopy (SPM) are being studied. The core technologies of high-density recording media relate to manufacture of a tip and a cantilever, recording and reproducing principles of the medium, signal processing, and manufacture of an XY-stage. In particular, the XY-stage and the signal processing circuitry take up a large portion of the storage device. Therefore, to reduce the overall size of a system, studies on increasing the driving force of the XY-stage per unit area or composing the signal processing circuitry of a signal chip are ongoing.

To detect the position of an XY-stage, the present invention employs capacitive sensing which is the principle of detecting the acceleration of a conventional electrostatic accelerometer. Since the principles of the present invention are applicable to the detection of acceleration, problems of a conventional method for detecting acceleration with an accelerometer will now be described.

One method for measuring acceleration in a multi-axis electrostatic accelerometer involves using accelerometers for each axis. However, the shortcomings of this method are that it is difficult to position accelerometers without interference between each axis and positioning accelerometers along each axis is costly. To surmount these shortcomings, a method of detecting acceleration along each axis by disposing proof masses sensitive to each axis on a silicon wafer and integrating detecting circuits of each axis has been proposed.

Furthermore, a method of detecting acceleration along multiple axes from a single proof mass has been proposed. The method is advantageous in terms of a small chip area and a low manufacturing cost. In the same context, according to a paper by M. A. Lemkin, B. E. Boser, D. Auslander and J. H. Smith, "A 3-axis Force Balanced Accelerometer Using a Single Proof-mass", International Conference on Solid-State Sensor and Actuators (TRANSDUCERS'97), Vol. 2, pp1185–1188, a carrier signal is applied to a proof mass and then the response to the signal is demodulated to measure changes in capacitance from a stator of each axis. Also, according to a paper by K. Jono, M. Hashimoto and M. Esashi, "Electrostatic Servo System for Multi-axis Accelerometers", IEEE Workshop on Micro Electro Mechanical Systems(MEMS '94) pp251–256, a carrier signal of different frequency is applied to a stator of each axis, and a synchronous demodulator of different frequency for each axis is connected to a proof mass, thus measuring acceleration along each axis. However, these methods have a drawback in that a chip area increases since a demodulating circuit is provided for each axis.

In a paper by H. Ahmad, A. J. Al-Khalili, L. M. Landsberger and M. Kabrizi, "A two-dimensional micromachined accelerometer", IEEE Transactions on Instrumentation and Measurement, Vol. 46, No. 1, pp 18–26, 1999, interference between each axis is removed by switching a signal path by 12 switches, and changes in capacitance are measured in a time-division manner by a charge amplifier and a low-pass filter using a portion of the response to an excitation signal. However, this method has drawbacks in that many switches and circuits for processing signals on each axis are needed and that the amplitude of a signal is small and the signals are susceptible to noise since an average voltage for the cycle of an excitation signal is obtained by passing an output voltage of a pulse form which is proportional to changes in capacitance through a low-pass filter. U.S. Pat. No. 5,939,633 has addressed a method of detecting a change in capacitances by measuring voltages of a movable proof mass twice along each axis and calculating the difference between the measured voltages. However, the method has drawbacks in that the voltage of the proof mass is initialized at every cycle, interference between each axis exists unless a voltage of high frequency is applied, and a separate demodulator is used for the measurements along each axis. Furthermore, it has proven difficult to calculate acceleration from voltages of the proof mass measured twice with a time lag.

SUMMARY OF THE INVENTION

To solve the above problems, it is an objective of the present invention to provide an apparatus for sensing the position of an electrostatic XY-stage through time-division multiplexing, which is capable of sensing the positions of X- and Y-axes of the stage by applying an excitation signal having a phase difference to a stator of each axis of the XY-stage and then time-division detecting changes in capacitance from a moving plate.

Accordingly, to achieve the above objective, the present invention provides an apparatus for sensing the position of an electrostatic XY-stage through time-division multiplexing. The apparatus includes: a stage composed of a moving plate for moving a recording medium, rotor combs connected to the moving plate so that the rotor combs and the moving plate have the same electric potential, and stator combs of predetermined axes, wherein differential capacitors are formed between the rotor and stator combs; an amplifier connected to the stage for outputting position information in a time-division manner, in which a time constant is designed so as to prevent interference between position information output from the stage; a sample/hold unit for sampling and holding the time-division position information output from the amplifier in response to a timing control signal; and a controller which outputs a control signal such that the time-division position information from the amplifier can be sampled and held when the information reaches a maximum, reads position information output from the sample/hold unit, and generates excitation signals having different phases to each be applied to a different axis.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

Figure 1:
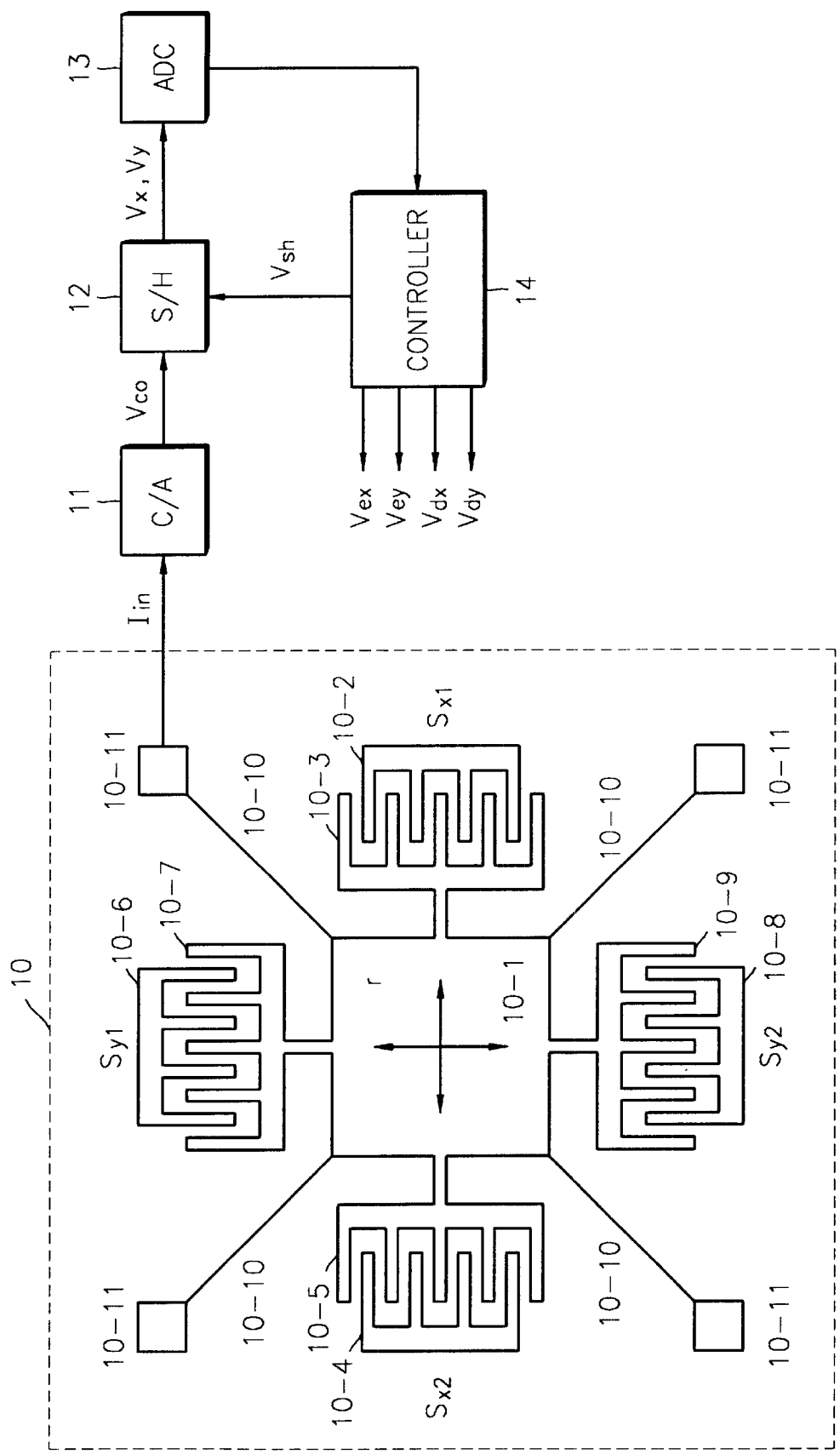
FIG. 1 is a block diagram showing the configuration of an apparatus for sensing the position of an electrostatic XY-stage through time-division multiplexing according to the present invention.

Referring to FIG. 1, an apparatus for sensing the position of an electrostatic XY-stage through time-division multiplexing according to the present invention includes an electrostatic XY-stage 10, a charge amplifier (C/A) 11, whose parameters are set in such a way as to prevent interference between position information about each axis, for outputting position information in a time-division manner, a sample/hold (S/H) unit 12 for sampling or holding the output of the C/A 11 in response to a timing control signal, an analog-to-digital converter (ADC) 13 for digitizing the position information output from the S/H unit 12, and a controller 14 for outputting the timing control signal so that the S/H unit 12 can sample the time-division position information during a predetermined period of time and for reading the position information output from the ADC 13 and outputting a signal for driving the stage 10 and an excitation signal.

The stage 10 in this invention includes a moving plate 10-1, a stator comb 10-2 disposed in a positive x-direction and a rotor comb 10-3, a stator comb 10-4 disposed in a negative x-direction and a rotor comb 10-5, a stator comb 10-6 disposed in a positive y-direction and a rotor comb 10-7, and a stator comb 10-8 disposed in a negative y-direction and a rotor comb 10-9. Here, springs 10—10 connect the moving plate 10-1 to fixed portions 10-11, thus mechanically serving as springs while electrically forming a common node.

Figure 2:
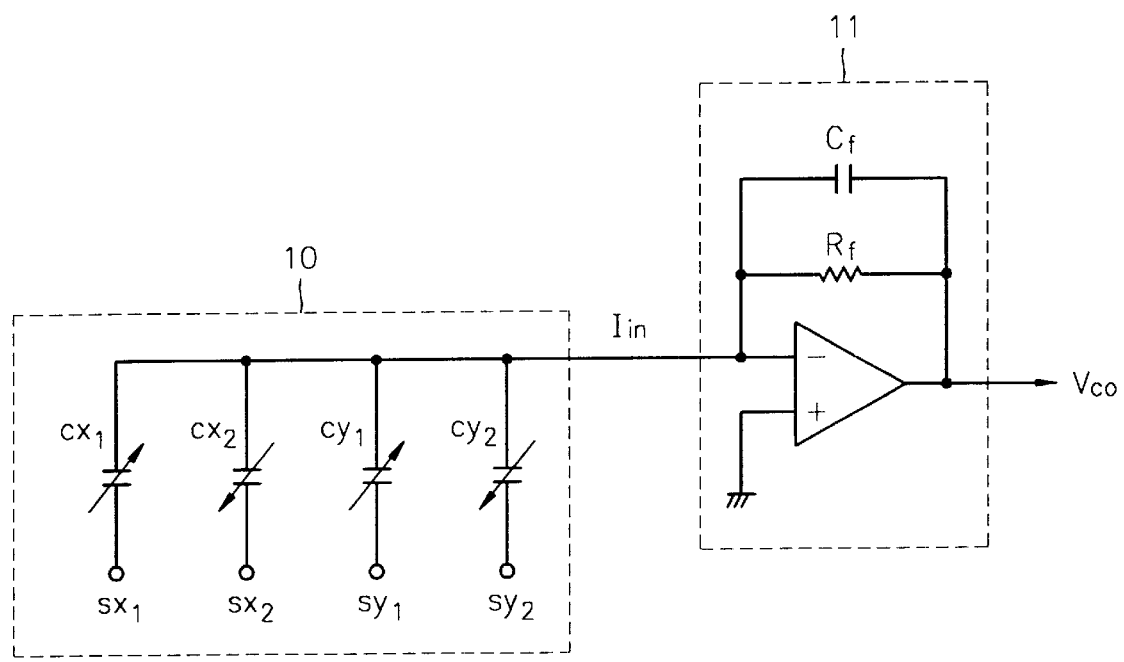
FIG. 2 is a circuit diagram of a stage and a charge amplifier in the apparatus of FIG. 1.
Figure 3:
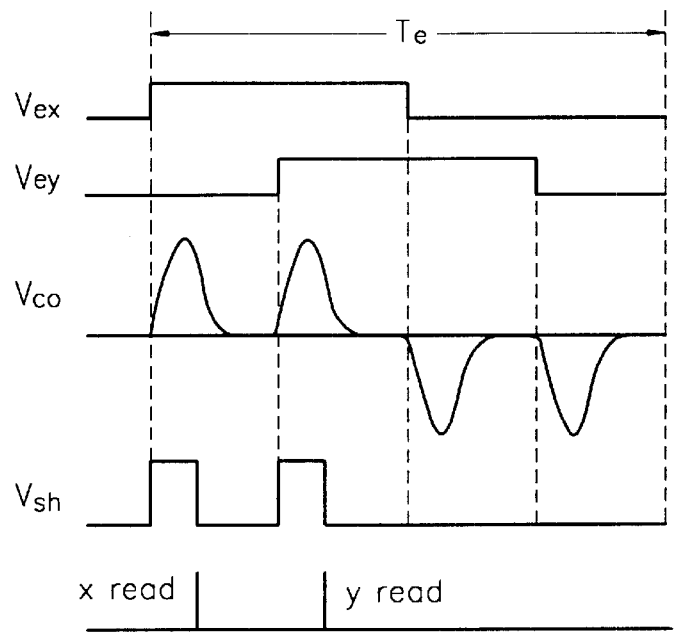
FIG. 3 is a timing diagram for an embodiment of the present invention used in the apparatus of FIG. 1.
Figure 4:
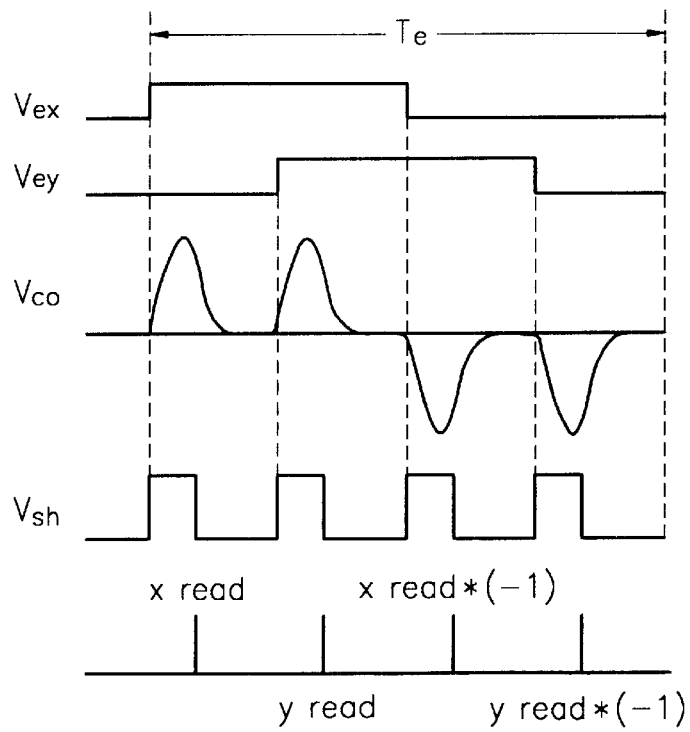
FIG. 4 is a timing diagram for another embodiment of the present invention used in the apparatus of FIG. 1.

FIG. 2 shows an equivalent circuit of the electrostatic XY-stage 10 and a circuit of the C/A 11 in the apparatus of FIG. 1. FIG. 3 is a timing diagram for an embodiment of the present invention used in the apparatus of FIG. 1, and FIG. 4 is a timing diagram for another embodiment of the present invention used in the apparatus of FIG. 1. FIGS. 5A–5E are simulation waveforms of signals in the apparatus of FIG. 1.

The present invention will now be described in detail with reference to FIGS. 1–5. The electrostatic XY-stage 10, to which the present invention is applied, includes the moving plate 10-1, the stator comb 10-2 disposed in a positive x-direction and the rotor comb 10-3, the stator comb 10-4 disposed in a negative x-direction and the rotor comb 10-5, the stator comb 10-6 disposed in a positive y-direction and the rotor comb 10-7, and the stator comb 10-8 disposed in a negative y-direction and rotor comb 10-9. The rotor combs and the stator combs of each axis, as shown in FIG. 2, form four variable capacitors $c_{x1}$, $c_{x2}$, $c_{y1}$, and $c_{y2}$ which serve as a driver. That is, application of a voltage across both terminals produces an electrostatic force to drive the moving plate 10-1 in x- and y-axis directions. Here, the springs 10—10 connect the moving plate 10-1 to the fixed portions 10-11, mechanically serving as springs and electrically forming a common node.

Assuming that a spring of a driver of each axis is a constant and there is no interference between each axis, a second order equation of motion for displacement x in the x-direction is Equation (1):

$$mx'' + dx' + kx = f_x \qquad (1)$$

where m, d, and k denote a mass of the stage 10, a damping constant, and a spring constant, respectively. $f_x$ denotes the net electrostatic force in the x-direction generated by voltages $v_{sx1}$ and $v_{sx2}$ applied between the stator comb sx1 10-2 and the rotor comb 10-3 and between the stator comb sx2 10-4 and the rotor comb 10-5, respectively.

If the variable capacitors $c_{x1}$ and $c_{x2}$ have a symmetrical structure as indicated by $\partial c_{x1}/\partial x = -\partial c_{x2}/\partial x = \partial c/\partial x$, an electrostatic force $f_x$ can be obtained from Equation (2):

$$f_x = 2\frac{\partial c}{\partial x} V_B v_{dx} \qquad (2)$$

where $\partial c/\partial x = N\epsilon_0 h/g$ and N is the number of combs in the x-direction, $\epsilon_0$ is a dielectric constant ($=8.854e^{-12}$F/m), h is the height of a structure, g is a gap, $V_B$ is a bias voltage, and $v_{dx}$ is a driving voltage in the x-direction.

The equation of motion for the y-direction and an electric force $f_y$ can be obtained in the same manner.

Current flowing in the variabl capacitor $c_{x1}$ disposed in the positive x-direction can be expressed by Equation (3):

$$i_{x1} = \frac{\partial c}{\partial x}\left[(V_B + v_{dx})\frac{dx}{dt} + (X_0 + x)\frac{dv_{dx}}{dt}\right] \qquad (3)$$

where $X_0$ denotes a length by which the stator comb 10-2 and the rotor comb 10-3 in equilibrium overlap each other. Current flowing in the variabl capacitors $c_{x2}$, $c_{y1}$, and $c_{y2}$ can be obtained in the same manner.

The configuration of the C/A 11 will now be described. An inverting terminal of the C/A 11 is connected to the fixed portion 10-11 while a non-inverting terminal is grounded. A capacitor $C_f$ and a resistor $R_f$ coupled in parallel are connected to the inverting terminal and the output terminal of the C/A. If the C/A 11 has the characteristics of an ideal operational amplifier, that is, the input impedance is infinitely large and the potential difference between the inverting and non-inverting terminals is zero, the sum $i_{in}$ of current flowing in the variable capacitors $c_{x1}$, $c_{x2}$, $c_{y1}$, and $c_{y2}$ of each axis is introduced into the capacitor $C_f$ and the resistor $R_f$ of the C/A 11, both of which form a feedback connection as expressed by Equation (4):

$$i_{in} = i_{x1} + i_{x2} + i_{y1} + i_{y2} \qquad (4)$$

where $i_{x1}$, $i_{x2}$, $i_{x3}$, and $i_{x1}$ denote current flowing in the capacitors $c_{x1}$, $c_{x2}$, $c_{y1}$, and $c_{y2}$.

An excitation signal is applied to each axis as shown in FIGS. 3 and 4 and the response thereto is detected in the C/A 11. FIG. 3 is a timing diagram when the position of the stage 10 is detected once per cycle and FIG. 4 is a timing diagram when the position of the stage 10 is detected twice per cycle. A square-wave excitation signal $v_{ex1}$ is applied to the x-axis stator sx1 10-2 while a square-wave excitation signal $v_{ex2}$ having a phase difference of 180 degrees to the excitation signal $v_{ex1}$ is applied to the x-axis stator sx2 10-4. Similarly, excitation signals $v_{ey1}$ and $v_{ey2}$ are applied to the y-axis stators 10-6 and 10-8, respectively, but the excitation signals $v_{ey1}$ and $v_{ey2}$ have a phase difference of 90 degrees to the x-axis excitation signals $v_{ex1}$ and $v_{ex2}$.

If the excitation signals are applied, the sum $i_{in}$ of current flowing in the variable capacitors $c_{x1}$, $c_{x2}$, $c_{y1}$, and $c_{y2}$ is given by Equation (5):

$$i_{in} = 2\frac{\partial c}{\partial x} x \frac{dv_{ex}}{dt} + 2\frac{\partial c}{\partial y} y \frac{dv_{ey}}{dt} \qquad (5)$$

where $v_{ex} = v_{ex1} - v_{ex2}$ and $v_{ey} = v_{ey1} - v_{ey2}$.

As shown in Equation (5), the current $i_{in}$ is a linear combination of displacements along each axis and differentiation values of the excitation signals, but since the excitation signals have a phase difference of 90 degrees, the current $i_{in}$ has four pulse forms over a cycle Te of the excitation signal, the amplitude of which is proportional to the displacements x and y. Thus, the output voltage of the C/A 11, which is the response to the current $i_{in}$, is detected using the S/H unit 12, thereby enabling the position of the stage 10 along x- and y-axes to be detected with a single circuit.

By Laplace transform, an output voltage $v_{co}$ of the C/A 11 and the input current $i_{in}$ are related by Equation (6):

$$V_{CO} = -\frac{1}{C_f}\frac{1}{s+w_f}I_{in} \quad (6)$$

where $\omega_f^{-1} = R_f C_f = \tau_f$.

As is evident from Equation (6), the output voltage $v_{co}$ of the C/A 11 over the input current $i_{in}$ is a first-order system and a time response is determined by a time constant $\tau_f$. Accordingly, the time constant $\tau_f$ satisfying the following Equation (7) is determined so as to prevent responses to a current pulse input at time intervals of $T_e/4$ from overlapping.

$$\tau_f = \frac{T_e}{4\alpha} \quad (7)$$

where $\alpha$ is a constant greater than 5. Also, since $R_f$ is a DC gain as shown in Equation (6), $R_f$ and $C_f$ are set greater and smaller, respectively, both of which satisfy conditions of Equation (7).

As shown in FIGS. 3 and 4, the controller 14 applies a control signal $v_{sh}$ to the S/H unit 12 when the output voltage $v_{co}$ of the C/A 11 reaches a maximum. Since the current $i_{in}$ has a negative value on the falling edges of the excitation signals as shown in Equation (5), the response to the rising edge of each excitation signal is detected.

To detect the position of the stage 10 twice per cycle using the response to the falling edge of each excitation signal, the controller 14 applies a control signal $v_{sh}$ to the S/H unit 12 also when the response to the falling edge of each excitation signal reaches a maximum, reversing the sign of the detected value. The ADC 13 converts the sampled and held signal to a digital value, and the digital value is input to the controller 14 as a position detection signal $v_{xy}$ (read).

Figure 5A:
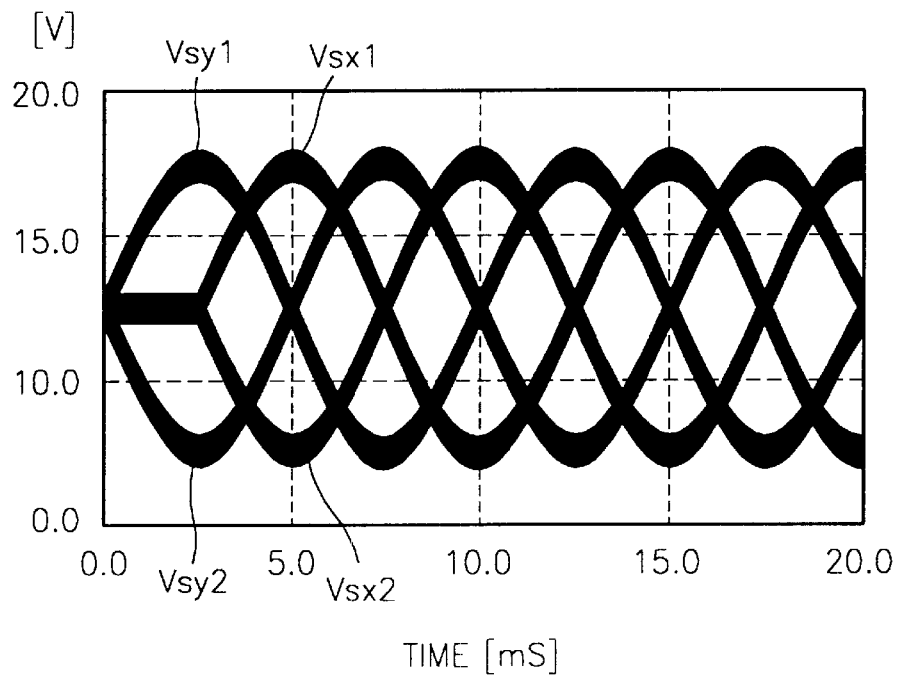
FIGS. 5A–5E are simulation waveforms of signals in the apparatus of FIG. 1.

FIGS. 5A–5E are simulation waveforms of signals in the present invention. As shown in FIG. 5A, a bias voltage $V_B$ of 12 V, a sine-wave driving voltage of amplitude 5.0 V and frequency 100 Hz, and a square-wave excitation signal of frequency 10 kHz and amplitude 0–1 V were applied to the y-axis stators sy1 and sy2 10-6 and 10-8. Also, a bias voltage $V_B$ of 12 V, a sine-wave driving voltage delayed by 90 degrees of amplitude 5.0 V and frequency 100 Hz, and a square-wave excitation signal of frequency 10 kHz and amplitude 0–1 V are applied to the x-axis stators sx1 and sx2 10-2 and 10-4.

Figure 5B:
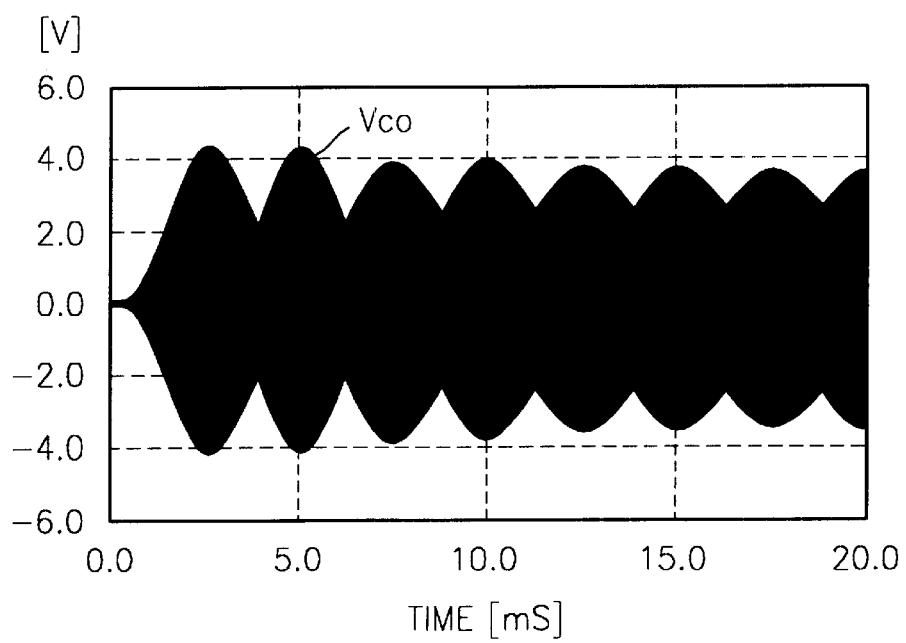
Figure 5C:
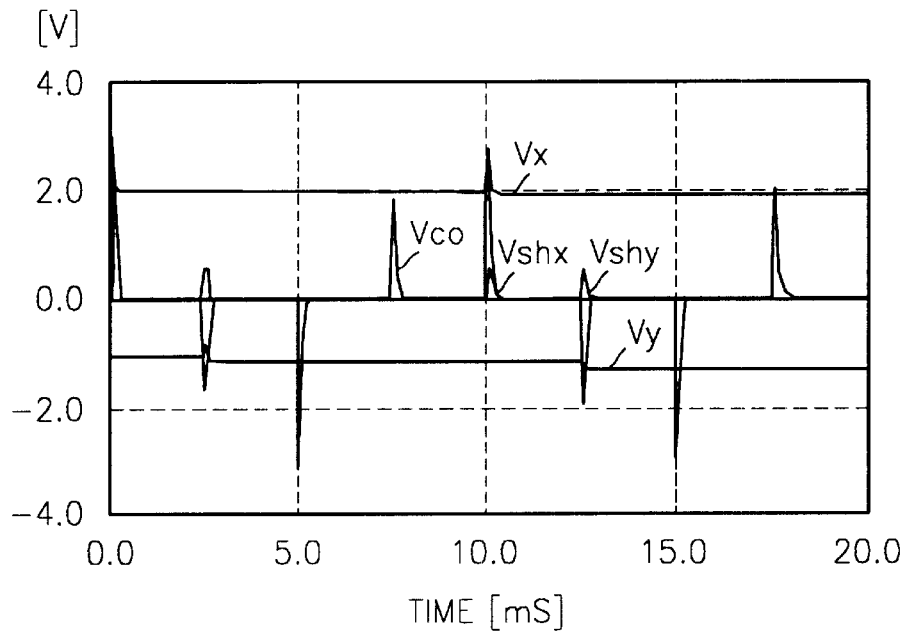
Figure 5D:
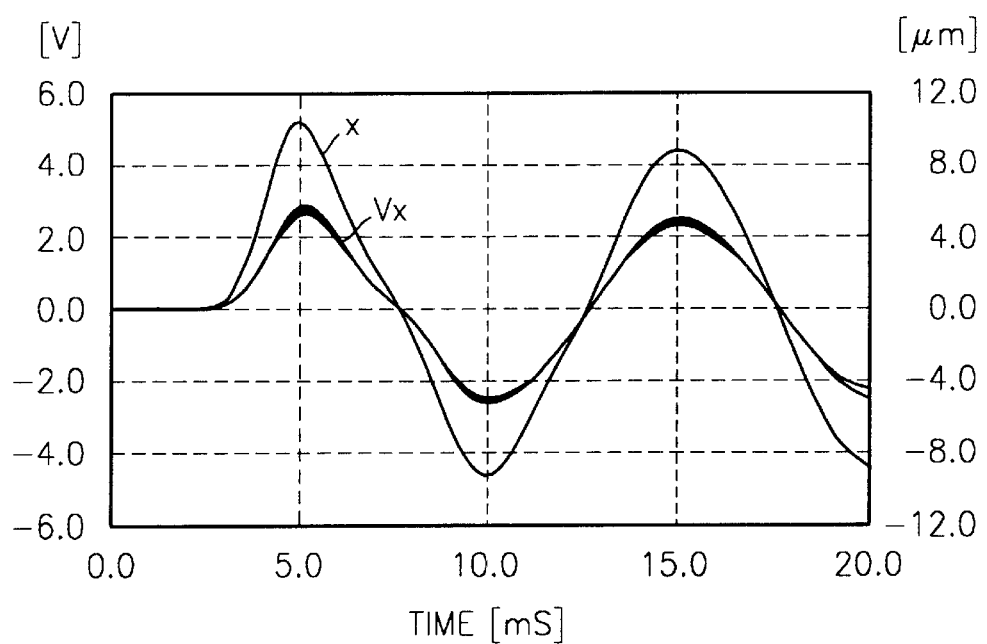
Figure 5E:
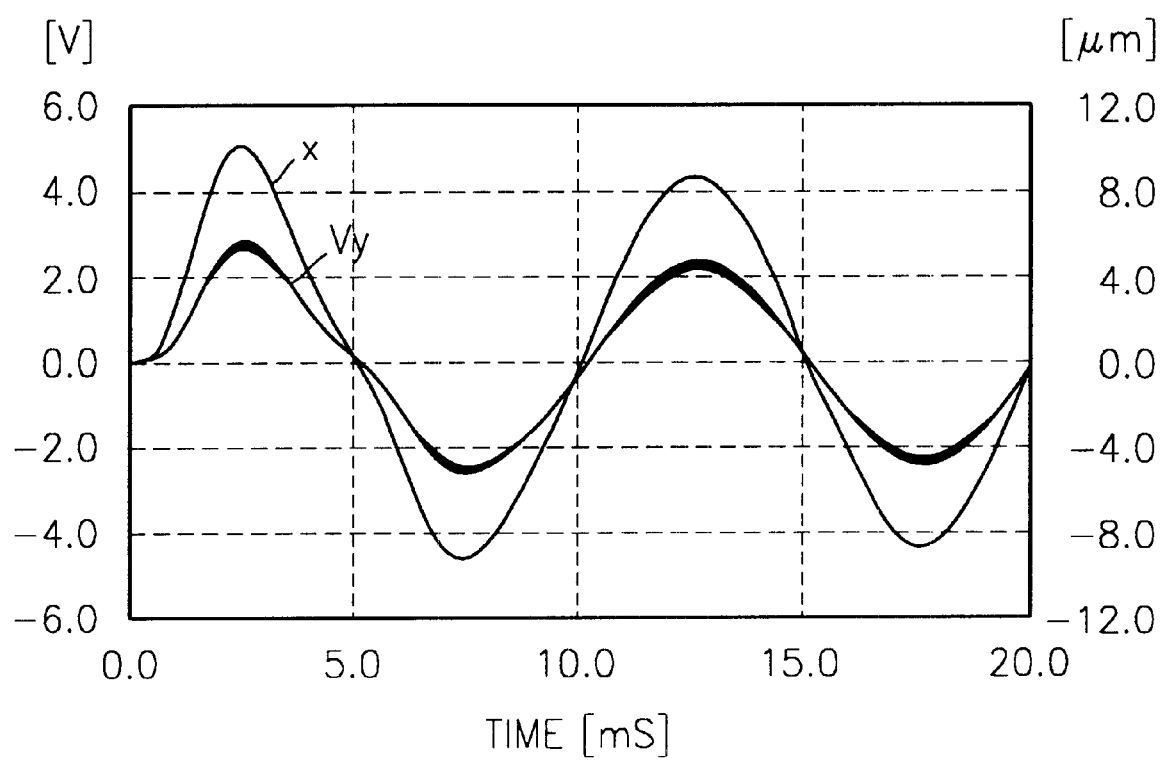

FIG. 5B shows the responses to the excitation signals applied to x- and y-axis stators, which are the output voltage $v_{co}$ of the C/A 11. FIG. 5C enlarges the output voltage $v_{co}$ of the C/A 11. As is evident from FIG. 5C, the response to each excitation signal is sufficiently attenuated during a duration $T_e/4$, so that there is no interference between signals. FIGS. 5D and 5E illustrate the actual displacements x and displacements detected by time-division multiplexing $v_x$, along the x-axis, which ensure the position sensing for the XY-stage 10 proposed in this invention.

As described above, the position of the XY stage, which is a biaxial system, can be detected using time-division multiplexing. However, the present invention is applicable to an n-axial system. In this case, excitation signals applied to each axis have a phase difference of 180°/n and the time constant of C/A 11 is set to $$\tau_f = \frac{T_e}{2n\alpha}.$$

Thus, a voltage is measured by the S/H unit 12 when the response to each excitation signal reaches a maximum, which allows n-axis position information to be measured by time-division multiplexing.

While this invention has been particularly shown and described with reference to preferred embodiments thereof, it will be understood by those skilled in the art that various changes in form and details may be made therein without departing from the spirit and scope of the invention as defined by the appended claims.

According to the present invention, acceleration or position is detected with a single detection circuit from a single mass along multiple axes through the use of time-division multiplexing, thereby reducing the area of the detection circuit. An analog system is used instead of a switch for switching a circuit so as to detect signals, thereby eliminating effects of switching and detecting a stable signal. Furthermore, the present invention is applicable to a multi-axial system.

What is claimed is:

1. An apparatus for detecting the position of a stage, the apparatus comprising:
   a stage including:
     a moving plate,
     rotor combs connected to the moving plate so that the rotor combs and the moving plate have the same electric potential, and
     stator combs at predetermined axes,
   wherein differential capacitors are formed between the rotor and stator combs;
   an amplifier connected to the stage for outputting position information in a time-division manner, in which a time constant is designed so as to prevent interference between position information output from the stage;
   a sample/hold unit for sampling and holding the time-division position information output from the amplifier in response to a timing control signal; and
   a controller which outputs a control signal such that the time-division position information from the amplifier can be sampled and held when the information reaches a maximum, reads position information output from the sample/hold unit, and generates excitation signals having differing phases to each be applied to a different axes.

2. The apparatus of claim 1, wherein the amplifier has an inverting terminal connected to a fixed portion, a non-inverting terminal connected to a ground, and a resistor and a capacitor coupled in parallel to an output terminal and connected to the inverting terminal.

3. The apparatus of claim 2, wherein the resistance of the resistor and the capacitance of the capacitor of the amplifier vary with time, and the position information output from the amplifier is output in a time-division manner by controlling the varying resistance and capacitance values.

4. The apparatus of claim 1, wherein the stage is made of stators of multiple axes.

5. The apparatus of claim 4, wherein the controller generates driving signals and excitation signals having a predetermined phase difference depending on the number of axes.

* * * * *